Patented Mar. 10, 1942

2,275,792

UNITED STATES PATENT OFFICE 2,275,792

CAUSTICIZATION OF SODA

William Carlton Moseley, Lake Charles, La., assignor to The Mathieson Alkali Works, Inc., New York, N. Y., a corporation of Virginia No Drawing. Application August 1, 1940, Serial No. 349,293

2 Claims. (Cl. 23—185)

In the production of caustic liquors by means of the ammonia soda process, an aqueous solution of soda ash is causticized with lime, the causticized liquor is concentrated to the required concentration with respect to sodium hydroxide after separating precipitated calcium carbonate, and precipitated sodium carbonate and sodium sulfate are then settled from the concentrated liquor. The separated calcium carbonate is burned, together with required makeup calcium carbonate, to produce the lime required for causticization in repeated cycles of operation. For many years the ammonia soda industry has believed it to be essential to maintain a minimum ratio of sodium sulfate to sodium carbonate in the concentrated, causticized liquor in order to secure effective settling of these salts which would otherwise appear as impurities in the caustic liquor product. To this end, sodium sulfate has been regularly added to the liquor as a part of established practice.

I have now discovered that, although a substantial proportion of sodium sulfate must be present to secure effective settling of precipitated sodium carbonate and sodium sulfate under ordinary circumstances, effective settling of precipitated sodium carbonate and sodium sulfate can also be secured if the concentration of sodium sulfate with respect to sodium hydroxide produced by causticization be maintained within a low maximum limit during causticization, concentration and subsequent settling. I have in fact discovered that there are two critical points, rather than one, in the concentration of sodium sulfate with respect to sodium hydroxide. Between these points, settling of precipitated sodium carbonate and sodium sulfate from the concentrated liquor is very poor. Above the higher point, the settling is good, and this is the technical basis for adding sodium sulfate in established practice. But below the hitherto unsuspected lower point, the low maximum limit characteristic of application of my discovery, the settling is excellent. This lower point, a maximum concentration of sodium sulfate, approximates 0.0025% Na₂SO₄ (by weight) on the sodium hydroxide, NaOH, present following causticization.

Specific precautions must be taken to establish and to maintain a concentration of sodium sulfate with respect to sodium hydroxide within the specified maximum limit. The bulk of sulfate contamination is derived from the lime used in the causticization, from impurities present in makeup calcium carbonate and from oxidation products of sulfur present in fuel burned to produce the lime for causticization. To establish and to maintain the low concentration of sodium sulfate with respect to sodium hydroxide characteristic of application of my discovery, such sulfate contamination can be eliminated by selection of makeup calcium carbonate and selection of the fuel used for burning the calcium carbonate. For example, oyster shells washed substantially free of saline material can be used as makeup calcium carbonate and low sulfur natural gas, or natural gas washed substantially free of hydrogen sulfide and the like can be used as fuel. By taking such precautions to establish and to maintain the specified maximum limit, several important advantages are secured.

The production of liquid caustic, the 50% NaOH aqueous caustic liquor of commerce, by my process will illustrate the application of my discovery. The operation was carried out by causticizing soda ash with lime in aqueous solution to produce a caustic liquor containing about 11% NaOH (by weight), concentrating the causticized liquor to a concentration of sodium hydroxide approximating 50% NaOH after separating precipitated calcium carbonate and settling precipitated sodium carbonate and sodium sulfate from the concentrated liquor. With a sodium sulfate concentration ranging from about 0.006% to about 0.057% Na₂SO₄ on the sodium hydroxide, a range embracing sulfate contamination representative of operation under ordinary circumstances, the settling was very poor. By adding sodium sulfate to bring the concentration of sodium sulfate to or somewhat above about 0.064% Na₂SO₄ on the sodium hydroxide, as in established practice, good settling was secured, but the sulfate content of the caustic liquor product varied irregularly from 0.04% to 0.11% Na₂SO₄. By establishing and maintaining a maximum concentration of sodium sulfate of 0.0025% (by weight) Na₂SO₄ on the sodium hydroxide, excellent settling was secured and the sulfate content of the caustic liquor product remained uniformly low between 0.02% and 0.03% Na₂SO₄.

The application of my discovery, as described, eliminates a step in the production of caustic liquors by means of the ammonia soda process hitherto believed to be essential, eliminates the expense of sodium sulfate as a process addition, secures equivalent or improved settling of precipitated sodium carbonate and sodium sulfate, enables the production of a more uniform product, and enables the production of a product pure with respect to sulfate contamination. The first two advantages afford important operating economies. The second two advantages, uniformity and purity, are particularly important in the production of caustic liquors for industries making extreme requirements in these respects, the rayon industry for example.

I claim:

1. In the production of liquid caustic, the improvement which comprises causticizing soda ash with lime in aqueous solution while maintaining a maximum concentration of sodium sulfate not substantially exceeding 0.0025% $Na_2SO_4$ on the sodium hydroxide present following causticization, concentrating the causticized liquor to a concentration of sodium hydroxide approximating 50% NaOH after separating precipitated calcium carbonate, and precipitating and settling precipitated sodium carbonate and sodium sulfate from the concentrated liquor while maintaining said maximum concentration of sodium sulfate.

2. In the production of caustic soda by causticization of soda ash with lime, the improvement which comprises maintaining a maximum concentration of sodium sulfate not substantially exceeding 0.0025% $Na_2SO_4$ on the sodium hydroxide present following causticization and subsequently precipitating and settling precipitated sodium carbonate and sodium sulfate from the causticized liquor while maintaining said maximum concentration of sodium sulfate.

WILLIAM CARLTON MOSELEY.